United States Patent Office 3,389,182
Patented June 18, 1968

3,389,182
METHOD FOR THE PREPARATION OF FLUOROKETONES
Richard F. Merritt, Huntsville, Ala., assignor to Rohm & Haas Company, Philadelphia, Pa., a corporation of Delaware
No Drawing. Filed July 20, 1964, Ser. No. 383,991
4 Claims. (Cl. 260—590)

ABSTRACT OF THE DISCLOSURE

Fluoroketones having the formula

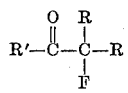

are prepared by the reacting olefins having the formula

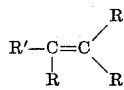

with $OF_2$ in a temperature range of about −80° C. to 0° C. and at subatmospheric pressures of no more than 700 mm. R′ represents alkyl group 1 to 8 carbon atoms and phenyl or alkyl substituted phenyl and R is alkyl of 1 to 8 carbon atoms, hydrogen and phenyl, wherein at least one said R groups is hydrogen or phenyl.

---

This invention deals with a method for the preparation of specific fluoroketones.

The fluoroketones prepared by the method of this invention may be represented by the formula

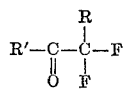

wherein the R symbols individually represent alkyl groups of 1 to 8 carbon atoms, preferably 1 to 4, hydrogen, phenyl or alkyl-substituted phenyl, with the restriction that at least one of the R groups represents hydrogen or phenyl. The R′ symbol represents alkyl groups of 1 to 8 carbon atoms and phenyl, or alkyl-substituted phenyl. The alkyl substituent on the phenyl group may contain up to eight carbon atoms and may take the form of one or more alkyl groups, as desired.

Typically the R groups individually may represent hydrogen, methyl, ethyl, isopropyl, isobutyl, butyl, hexyl, 2-ethylhexyl, phenyl, xylyl, tolyl and dipropylphenyl.

The fluoroketones of this invention are prepared by reacting oxygen difluoride ($OF_2$) with an olefinic compound having the formula

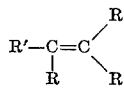

at a temperature range of about −80° C. to 0° C., preferably about −80° to −40° C. The higher molecular weight olefin reactants generally require the somewhat higher reaction temperatures, whereas when the lower molecular olefins are used the preferred range is quite acceptable for high yields and safe reaction conditions.

Typical olefin reactants include 1,1-diphenylethylene, phenylethylene, 1-phenyl-1-butene, 1,2-diphenyl-1-hexene, 1-phenyl-1-octene, 1,1-diphenyl-1-octene, 1-phenyl-2-butyl-1-octene, 1,1-diphenyl-4-ethyl-1-hexene, 4-phenyl-5-methyl-5-octene and 2-phenyl-3-octyl-2-decene.

The reaction is strongly exothermic in nature and the lower reaction temperatures are employed for purposes of safety. It is possible in certain continuous reaction systems to use temperatures as high as 25° C. with reasonable safety by employing a flow of reactants in low concentrations.

The oxygen difluoride and olefin reactant react in a substantially 1:1 ratio, but it is preferred generally to employ an excess of oxygen difluoride to obtain maximum benefits. The excess oxygen difluoride is readily removed at the conclusion of the reaction by low temperature vacuum distillation.

It is important that the oxygen difluoride be added gradually to the olefin. As has been pointed out previously, the reaction is exothermic in nature and the gradual addition of oxygen difluoride is necessary in the direction of control and safety. Furthermore, the olefin cannot be added to the oxygen difluoride without the hazards of explosions. Hence, one must adhere strictly to this aspect of the invention. It is preferred to add the oxygen difluoride at a rate substantially commensurate with its rate of reaction in order to control the reaction and maximize yields.

Subatmospheric pressures are employed preferably no greater than 700 mm. It is preferred to use pressures in the range of about 100 to 400 mm.

While a solvent is not absolutely required, particularly with the lower molecular weight olefin reactants, it is frequently desirable to employ an inert volatile solvent in order to bring the reactants into desired proximity while controlling their concentrations. In order to be inert, the solvent must be saturated and have no acidic or basic sites.

Typical solvents are fluorotrichloromethane, carbon tetrachloride, pentane, diethyl ether, and others.

At the conclusion of the reaction, the product is isolated by standard distillation techniques and ready for known uses.

The invention may be more fully understood from the following examples which are offered by way of illustration and not by way of limitation:

Example I

There is added to a reactor 4.5 grams (25 mmoles) of 1,2-diphenylethylene. Over a period of three hours while the pressure is maintained at 400 mm., there is gradually introduced 23 mmoles of oxygen difluoride at a temperature of −78° C. The reaction mixture is degassed to insure complete removal of excess oxygen difluoride and then warmed to 25° C. under a blanket of nitrogen. There is obtained 5.01 grams of crude oil which is immediately placed on a silica gel column and eluted with pentane-methylene chloride solvent mixture. There is obtained 0.75 gram of a mixture of one part cis and six parts trans-α-fluorostilbene. The mixture has a melting point of 90° to 91° C. The proton NMR indicates a single non-aromatic proton (1:10 ratio) as a doublet centered at 5.54δ with coupling constant $J_{F-H}$ 67 c.p.s. with the trans adjacent vinylic fluorine and $J_{E-H}$ 21 c.p.s. for the cis compound. The product contains 82.91% carbon (84.82 theoretical) and 5.65% hydrogen (5.59% theoretical).

There is also obtained 0.84 gram of α-phenyl-α-fluoroacetophenone having a melting point of 43° C. The infrared spectrum shows carbonyl absorption at 5.90 m$\mu$ and C–F at 7.9 and 8.15 m$\mu$. The proton NMR has a single non-aromatic proton (ratio 1:10) as a doublet ($J_{H-F}$=51 c.p.s.) centered at 6.29δ. The fluorine spectrum possesses a doublet centered at +4049 c.p.s. (TFA) with a $J_{F-H}$ of 51 c.p.s. The product contains 78.11% carbon (78.49% theoretical) and 5.37% hydrogen (5.18% theoretical).

Similarly, there is produced a product within the range of this invention by reacting oxygen difluoride with 1-phenyl-2-butyl-1-octene.

Example II

In a manner similar to Example I, there is added to a reactor 4.5 grams (25 mmoles) of 1,1-diphenylethylene. During a period of four hours while the pressure is maintained at 500 mm., there is gradually introduced 22 mmoles of oxygen difluoride at a temperature of −78° C. The reaction mixture is degassed to insure complete removal of excess oxygen difluoride and then warmed to 25° C. under a blanket of nitrogen. There is obtained 5.75 grams of crude oil which is immediately chromatographed on silica gel. There is obtained as the major product 2.0 grams (66% yield) of colorless oil having a boiling point of 41° to 52° C. at 0.03 mm. The infrared spectrum shows the presence of carbonyl (5.85 m$\mu$) and C–F (8.10 m$\mu$). The proton NMR spectrum has two non-aromatic protons as a doublet centered at 8.5$\delta$ with a $J_{H-F}$ of 48 c.p.s. The fluorine NMR shows a triplet centered at +5996 c.p.s. (TFA) with a $J_{F-H}$ of 47 c.p.s. The 2,4-dinitrophenylhydrazone of the product contains 52.46% carbon (52.83% theoretical) and 4.51% hydrogen (3.48% theoretical) and 16.63% nitrogen (17.60% theoretical) and has a melting point of 223° to 224° C. The product is identified as $\omega$-fluoroacetophenone.

I claim:

1. A method for the preparation of fluoroketones having the formula

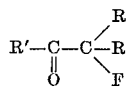

wherein, R' represents alkyl groups of 1 to 8 carbon atoms and phenyl, or alkyl-substituted phenyl, wherein R is selected from the class consisting of alkyl of 1 to 8 carbon atoms, hydrogen and phenyl, wherein at least one of said R groups is selected from the group consisting of hydrogen and phenyl which comprises reacting oxygen difluoride with a compound having the formula

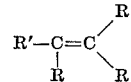

in a temperature range of about −80° C. to 0° C. and at subatmospheric pressures of no more than 700 mm., wherein the oxygen difluoride is added to the olefin reactant.

2. A method according to claim 1 wherein the temperature is about −80° C. to −40° C. and the oxygen difluoride is employed in excess.

3. A method according to claim 1 wherein the reaction is conducted in the presence of an inert volatile solvent and at pressures of about 100 to 400 mm.

4. A method according to claim 1 wherein two of the R groups are phenyl.

References Cited

Chemical Abstracts 62, 1940S, January–June 1965 Index.

DANIEL D. HORWITZ, *Primary Examiner.*